April 12, 1955
E. LAVERDISSE
2,705,854
METHOD AND APPARATUS FOR ENSURING RECTILINEAR
MOVEMENT OF RIBBONS OF GLASS SUBJECTED TO
CONTINUOUS GRINDING AND/OR POLISHING
Filed June 25, 1952
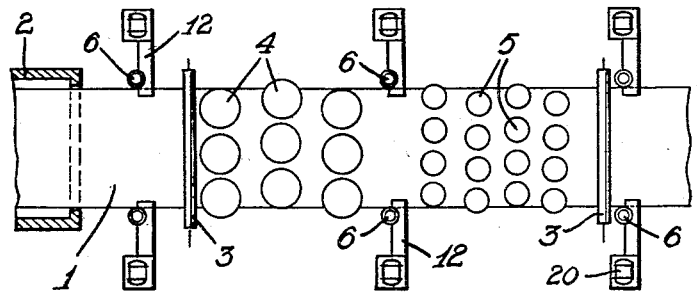
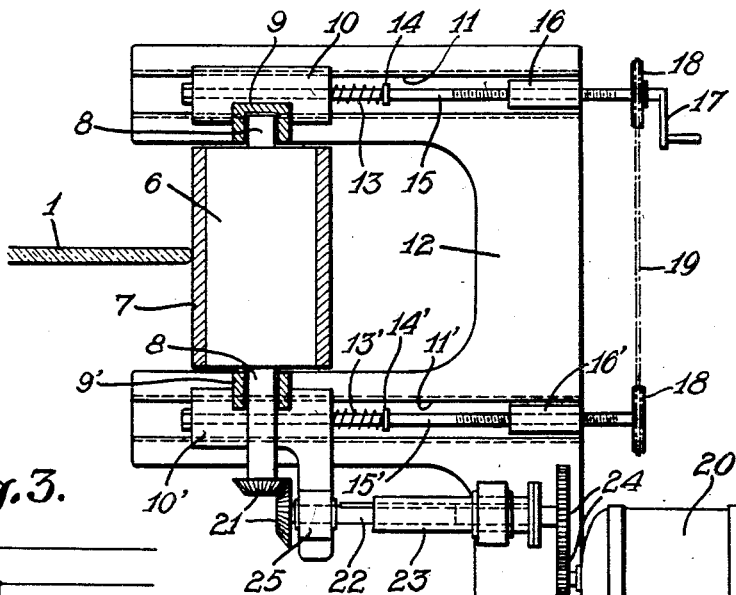
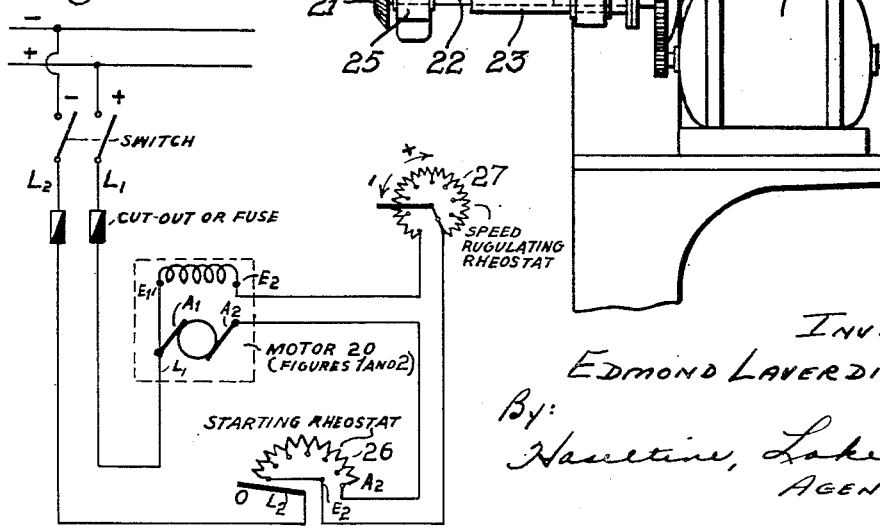
INVENTOR
EDMOND LAVERDISSE United States Patent Office 2,705,854
Patented Apr. 12, 1955

2,705,854

METHOD AND APPARATUS FOR ENSURING RECTILINEAR MOVEMENT OF RIBBONS OF GLASS SUBJECTED TO CONTINUOUS GRINDING AND/OR POLISHING

Edmond Laverdisse, Auvelais, Belgium, assignor to Les Glaceries de la Sambre, Societe Anonyme, Auvelais, Belgium, a Belgian company Application June 25, 1952, Serial No. 295,431

Claims priority, application Belgium June 30, 1951

4 Claims. (Cl. 51—112)

The present invention concerns the guiding of sheets of glass which, on leaving the lehr in the form of a continuous ribbon, are successively subjected to continuous grinding and polishing while being conveyed in a straight line by rollers or other conveying means.

It is sometimes difficult to ensure that the ribbon of glass extending over several dozen metres follows a straight path, and various means have already been proposed for obtaining this result by acting either on the faces of the sheet or on its edges. The present invention has for its object to provide a simple and efficient method and means for preventing or correcting deviations of the ribbon of glass.

According to the invention an accelerating or retarding frictional action is locally exerted on one or both lateral edges of the sheet, and this frictional action is adjusted to compensate for the tendency of the sheet to deviate in one direction or the other. The accelerating or retarding frictional action is exerted with the aid of rollers, the speed and, if desired, the pressure of which are regulatable and which are disposed at suitable intervals along the edges of the sheet.

The apparatus according to the invention therefore comprises along the edges of the sheet of glass, and in contact therewith, rollers mounted on shafts perpendicular to the plane of the sheet one opposite the other or in quincuncial arrangement, and actuated by motors so that the rotation of each roller can be modified independently of that of the other rollers. The shafts of the rollers are preferably supported by sliding members adapted to be moved towards the edges of the sheet against which they are applied by an elastic pressure.

The accompanying drawings show by way of example one constructional form of this apparatus.

Figure 1 is a diagrammatic plan view showing a sheet of glass leaving the lehr,

Figure 2 is an elevational view, partly in section, showing on a larger scale a roller and the device by which it is controlled, and Fig. 3 is a wiring diagram schematically showing an arrangement for varying the peripheral speed of the roller of Fig. 2.

In the example of Figure 1, the sheet of glass 1 leaving the lehr 2 in the manner of an endless band passes between the conveying rollers 3, then successively between the grinding tools or irons 4 disposed in pairs in order to act simultaneously on the two faces of the continuous glass sheet, and then between the polishing tools or polishers 5 similarly disposed in pairs. In addition to the conveying rollers 3 which act by friction on the two faces of the glass, there are shown on the two sides of the sheet 1 vertical rollers 6 which bear against the edges of the sheet with adjustable pressure and are driven by preferably separate motors, also at adjustable speeds.

For this purpose, each roller 6 may be controlled as hereinafter described with reference to Figure 2 of the drawings.

The roller 6, which is advantageously lined with a coating 7 of rubber or other friction material, is mounted on a vertical shaft 8, the bearings 9, 9' of which are mounted on sliding members, 10, 10' respectively, which are engaged in slideways 11, 11' in a frame 12. The roller 6 is normally applied against the edge of the sheet 1 by springs 13, 13' disposed respectively between the sliding members 10, 10' and shoulders 14, 14' formed on screw-threaded rods 15, 15' mounted in fixed nuts 16, 16'. By means of a control handle 17, wheels 18 and a chain 19, the rods 15, 15' may be rotated together in order to vary the pressure exerted on the edge of the sheet by the roller 6.

The shaft 8 of the roller 6 is driven by an electric motor 20 through bevel wheels 21, the extensible shaft 22, 23 and reduction gears 24. The extensible shaft is formed of a rod 22 supported by a bearing 25 connected to the sliding member 10' and a sleeve 23 which is fast with one of the gears 24, and in which the rod 22 is adapted to slide but not to turn. The roller 6 is thus constantly controlled by the motor 20 regardless of the position which it occupies in relation thereto.

The motors 20 are provided with a reversing device and a speed regulator, so that it is possible at any time to exert an accelerating or retarding frictional force on one or both edges of the sheet with the aid of one or more rollers 6, and thus to prevent or correct any tendency of the sheet of glass to deviate from a straight path or rectilinear movement.

Referring to Fig. 3, a wiring diagram is there shown of a circuit for varying the speed of each motor 20 and therefore of the roller 6 driven by the latter. As seen in Fig. 3, each motor 20 is of the variable speed type, and has a starting rheostat 26 and a speed regulating rheostat 27 electrically connected thereto. The speed regulating rheostat 27 acts to vary the current flowing through the field coil of the associated motor to thereby control the speed of the latter and consequently the peripheral velocity of the roller 6. Accordingly, by adjusting the rheostat 27 it is possible to vary the peripheral speed of the associated roller 6 to a speed either above or below the rectilinear speed of the glass sheet.

Constructional modifications may obviously be applied to the apparatus described without departing from the scope of the invention.

I claim:

1. A method of insuring rectilinear movement of an endless sheet of glass while the latter is subjected to continuous grinding and polishing action simultaneously on both faces of the glass sheet; comprising the steps of driving said glass sheet along a substantially horizontal rectilinear path, between upper and lower grinding and polishing tools, exerting a frictional action on different successive points of at least one of the longitudinal edges of said sheet, and varying the magnitude of said frictional action by varying the pressure and the speed with which said frictional action is exerted at each of said points independently of said action exerted at the other points to correct any tendency of the sheet to deviate from said rectilinear path.

2. An apparatus for ensuring rectilinear movement of an endless sheet of glass subjected to continuous surfacing action, simultaneously on both faces; said apparatus comprising means for driving said glass sheet along a substantially horizontal rectilinear path between upper and lower surfacing tools, rollers mounted on substantially vertical axes adjacent different successive points at the side edges of said sheet, said rollers being in frictional contact with said edges, and variable speed motors for imparting to each of said rollers independently of the other rollers an accelerating movement or a retarding movement to correct any tendency of the sheet to deviate from said rectilinear path.

3. An apparatus for ensuring rectilinear movement of an endless sheet of glass subjected to continuous surfacing action; said apparatus comprising means for driving said glass sheet along a substantially horizontal rectilinear path, rollers in frictional engagement with different successive points at the side edges of said sheet, adjustable means for yieldingly pressing said rollers against said edges, and adjustable means for driving any of said rollers independently of the other rollers at a peripheral speed lesser or greater than the speed of said glass sheet.

4. An apparatus for ensuring rectilinear movement of an endless sheet of glass subjected to continuous surfacing action; said apparatus comprising means for driving said glass sheet along a substantially horizontal rectilinear path, slides at different points on each side of said glass sheet movable laterally towards and away from said sheet, a substantially vertical shaft on each of said slides, a rotatable roller in frictional engagement with the corresponding point of the corresponding side edge of said glass sheet and mounted on each of said shafts, means for yieldingly pressing each of said slides independently of the other slides, towards the corresponding side edge of said glass sheet, and adjustable means for driving each of said rollers independently of the other rollers at a varying peripheral speed.

References Cited in the file of this patent

UNITED STATES PATENTS

| | | |
|---|---|---|
| 1,682,925 | Miller | Sept. 4, 1928 |
| 1,933,640 | Schafer | Nov. 7, 1933 |
| 2,270,362 | Waldron et al. | Jan. 20, 1942 |